United States Patent [19]

Nelson

[11] Patent Number: 4,954,101

[45] Date of Patent: Sep. 4, 1990

[54] IMPROVED CABLE FOR COUPLING BETWEEN DATA TERMINALS AND DATA SETS

[76] Inventor: Neal Nelson, 1019 S. Humphrey, Oak Park, Ill. 60304

[21] Appl. No.: 376,554

[22] Filed: Jul. 6, 1989

[51] Int. Cl.[5] ................................. H01R 11/00
[52] U.S. Cl. .................................... 439/502
[58] Field of Search .............. 439/502, 505, 507, 166, 439/171, 217, 221, 43, 49, 52, 518

[56] References Cited

U.S. PATENT DOCUMENTS 4,579,407 4/1986 Shimada .......................... 439/502
4,618,196 10/1986 Muzslay .......................... 439/492

Primary Examiner—Neil Abrams
Attorney, Agent, or Firm—Milton S. Gerstein; Marvin Benn

[57] ABSTRACT

An improved method for cabling of data communications between data terminals and data sets in which the present invention is a cable designed to replace conventional cables that are individualized (or customized) as male/female and/or null modem cable configurations. The present invention consists of a plurality of individual wires wherein each wire is assigned an individual use and meaning whereby a minimum of two wires are assigned to each lead wire from a data terminal which does not have a corresponding lead wire on the receiving data set. The second wire is electrically connected to the first wire allowing continuity in a null modem configuration while allowing a direct connection in a straight cable configuration. With the instant invention, the use of an appropriate second wire is all that is required to create all possible combinations of male-female, straight-null cables.

14 Claims, 2 Drawing Sheets

IMPROVED CABLE FOR COUPLING BETWEEN DATA TERMINALS AND DATA SETS

BACKGROUND OF THE INVENTION

The present invention relates to an improved method for cabling of data communications between data terminals and data sets. In particular, the present invention is a cable designed to replace conventional cables that are individualized (or customized) for a variety of male-/female and/or null modem configurations necessary to meet the cabling requirements for data communications in the marketplace.

The transmission of data from a data terminal (computer) to a data set (peripheral) is essential to disseminate information whether such dissemination is to a printer for documentation of data in a permanent form or to another peripheral for further manipulation of data. The use of data transmitted is limited only by one's imagination but the conventional method of transmitting such data to a printer, modem, etc... (hereinafter peripheral device) is by means of low resistance continuous wire connected directly from the computer (source) to the peripheral (destination) device. To accommodate the transmission of data the source device must have an output terminal to match the input terminal of the destination device.

The means used to carry the data may be one wire or a bundle of wires commonly referred to as a cable between the devices. A connector on each end of the cable is a convenient means to attach the cable to the device. The computer industry has standardized the various types of connectors. An established standardized connector to provide for the input/output of data to the device is a D-type connector. This connector does not necessary utilize each pin but is a connector that allows a wide variety of cable configurations from a single connector allowing manufacturers to standardize on the input/output connection but maintain the flexibility of designing their own wiring requirements between devices.

Systems having large numbers of signals to be carried by wire may use a standardized 9-pin, 15-pin, 25-pin, 37-pin or 50-pin D-type connector. The present invention can be used for any type connector but for illustration purposes and simplicity of discussion, the commonly used D-25 pin connector will be discussed hereinafter.

The problems associated with the present art of cabling between devices begin with the transmitting device mentioned which may also be a device that receives information from another transmitting device. The cabling between devices must handle this type of input/output of signals typically called data communication for streams of digital data is transferred between the computer (source) and the peripheral (destination). For example, data communications involving a computer and a modem can be simply coordinated by two inputs DSR (data set ready) and CTS (clear to send) and two outputs DTR (data terminal ready) and RTS (request to send). The computer utilizing the DTS & CTS pins of a D-25 connector and the modem utilizing the DTA & RTS pins of the D-25 connector are connected at the opposite end of the cable. To operate, the computer (data terminal) pulls its DTR and RTS pins low indicating to the modem (data set) that the "data terminal" is ready to send data and is requesting permission to send data. The data terminal DTR is connected to the data set's DSR and the data terminal RTS is connected to the data set's CTS line. The data set also pulls its DSR and CTS pins low indicating to the computer (data terminal) that the "data set" is ready to receive data. In this example, the computer, called the data terminal, is transmitting but it should be apparent that the data terminal will also accept data, whereby it could be referred to as data set. The point is that the cabling between DSR of the data set and DST of the data terminal must be directly coupled and the CTS of the data set and RTS of the data terminal must also be directly coupled. This scheme is perfectly adequate if the only devices connected were terminal and modem requiring two wires. Connections between such devices would consist of a cable connected to "pin 1" at one end of the cable/connector and to "pin 2" at the other end of the cable/connector, and Pin 2 at the one end to Pin 1 at the other end. As the amount of pins increase for different purposes such as a RI (ring indicator) to allow a computer to answer a phone and the RLSD (received line signal detect), also called the carrier line indicating that the carrier from the modem is detected (an audio tone on which several signals sent over the phone lines are superimposed) the problem occurs of which the present invention is directed. Connections of this type could not be made directly from a terminal to a data set (pin 2—2, pin 313 3, etc.) for each device considers itself the data terminal and would transmit data to an unreceptive pin. Even the TD (transmit data) and RDC (receive data) pins have this implied functionality, since the terminal transmits data on the TD pin but the modem receives data on the TD pin and the modem transmits its data to the RD pin so that the terminal can receive on the RD pin. An attempt to resolve this situation resulted in the use of multiple pin connectors designed to prevent direct wiring, by using a DB-25S female connector coupled to the data terminal DB-25P male connector to the data set. This crossed cabling technique is also known as a "null modem" cable, since it eliminated the need for modems to be placed between two terminal devices which were connected together.

The null modem did not resolve all problems for some computer manufacturers wired their hardware as terminal only. Therefore, communication wiring to another computer would have to be with null modem cable or by wiring to a modem with straight cable. Alternatively, computer manufacturers who wired their hardware as a data set required a null modem cable for connection to another computer (if set up as a terminal output) and a straight cable to connect to a conventional modem.

In addition, a major problem with the null modem scheme on a module pin cable is demonstrated by the DCD pin (data carrier detect) or any other pin that does not have a matching pin at the receiving (or sending) device. In these situations a common practice is to float the pin, i.e., no corresponding connector, or to couple it to the DSR or another pin where it would not cause additional problems.

The net effect of the situation is that the connection of any two devices might require either a malemale straight, or a male-female straight, or a female-female straight, or a male-male null, or a male-female null, or a female-female null and such a connection would not ensure that each source pin was wired to a "correct" corresponding pin.

Further problems exist when changing a straight cable to a null modem on a D-25 connector. Such a change requires six or more wires to be altered and jumpers must be inserted or removed. This problem alone created a whole industry for null modem adapters and female-male gender changers. However, the adapters are expensive, cumbersome and unnecessary in light of the instant invention.

The present invention is directed to a new and novel way of cabling the devices together by means of a universal cable that requires only two types of connectors to create all possible combinations of male/female connections. Thus, the present invention allows a conversion from a straight cable to a null cable by simply reversing the orientation of the snap-on connector.

SUMMARY OF THE INVENTION

The present invention relates to an improved method and apparatus for the cabling of data communication between computer(s) and/or computer peripherals. In particular, the present invention allows the use of a universal cabling technique thereby replacing the need for conventional individualized male/female and/or null modem cables. By use of the cabling technique of the present invention, a computer can be used in its conventional and customary manner to process, transmit and receive data through its conventional transmission port.

The present invention involves assigning the meanings to the individual wires within the cable in a symmetrical fashion utilizing two wires instead of one for any lead which does not normally have a corresponding mate. For example, in a conventional null modem cable, the transmit data lead wire on the data terminal (e.g. computer) connects to the receive data lead wire on the data set (e.g. modem). The data terminal ready on the data terminal connects to the data set ready on the data set. This one to one connection of each wire from the data terminal is conventionally connected to a corresponding data set lead. The result is a cable that limits the data terminal manufacturer and data set manufacturer to the amount of data communications between the two devices. The data carrier detect lead and signal ground lead exemplify this situation, for in a conventional cable, these leads do not have matching wires for a cross-over. In the past, placing these "non-paired" wires in the cable meant that if the connector at one end of the cable was reversed in an attempt to create a null modem cable, the data carrier detect, for example, would be connected directly to a signal ground resulting in improper data communications.

The present invention solves the above situation by assigning two wires to the signal ground lead allowing a mirror image of a conventional D-25 cable connection. Moreover, it is an object of the present invention to allow the use of two wires for any non corresponding wire in the cable with the wires jumpered together inside the connector, thereby allowing the use of conventional connectors. The appropriate second wire is all that is required to create all possible combinations of male-female, straight-null cables.

Another object of the present invention is to make a cable that can be converted from a "straight" to a "null" cable by simply reversing the orientation of a snap-on connector on one end.

Another object of the present invention is to provide a "null stub" cable segment which, when connected in the circuit of an existing cable assembly, will transform the cable from a straight to a null or a null to a straight.

Still another object of the present invention is to reduce the amount of components to replace the conventional cables, reducing costs to the manufacturers and consumers of data communication cables.

These and other objects of the invention will be apparent when referencing is made to the following detailed description and drawings.

DETAILED DESCRIPTION OF THE INVENTION

Figure 1:
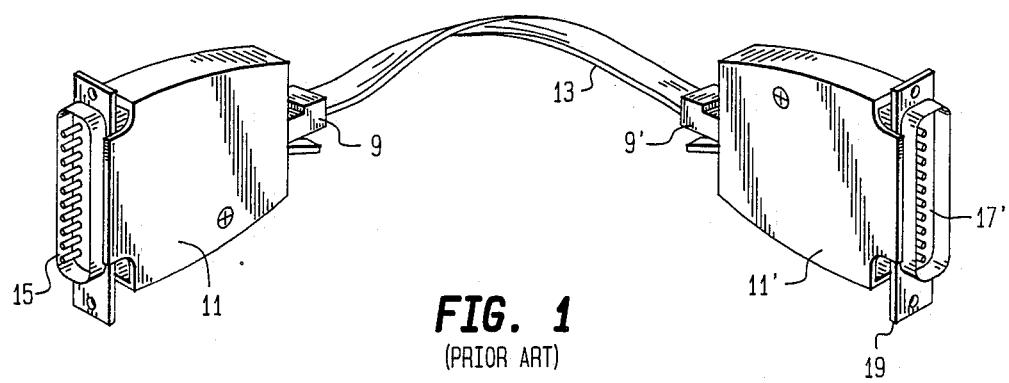
FIG. 1 is a pictorial view of a conventional cable used for coupling two conventional devices.

The present invention is perhaps best explained by a step-by-step description of an illustrative working device referring to FIG. 1, there is shown a cable assembly representative of the present invention depicting a D-25P male connector 11 coupled to a second D-25P male connector 11' by a wire cable 13. The D-25 male connectors 11 or 11' have two parallel rows of pins numerated from one to twenty five. (It should be noted that the present invention is not limited to D-25 connector and can be used with conventional D-9, 15, 37, 50 or any other type of cable connection/connector utilized for the transfer of data by hard-wire. As commonly known in the computer industry, these D-25 11 and 11' connectors are employed throughout the industry as a standard connector whether or not all twenty five pins are utilized. For example, the D-25P male connector 11 can utilize all twenty five available pins for the transfer of data or just one pin. For purposes of description, a D-25 connector will be described hereinafter with eight pins utilized in each connector. In addition, as is common practice in the industry, the remaining pins in each connector will be removed to avoid confusion. Again referring to FIG. 1, the wire cable 13 between connector 11 and 11' may have up to twenty five wires with each individual wire connected to an individual pin with the ends of the cable being coupled to a respective connector via quick-connects 9, 9'. For example, pin 1 would be connected to pin 1, pin 2 would be connected to pin 3, etc.... Again for purposes of description only, a minimal amount of wires will be utilized to make the invention operable.

Prior art utilizing eight pins in the connection between a modem and a computer as a transmitting and receiving device could be labeled as follows:

| TD (transmitting data) | RTS (request to send) |
| DSR (data set ready) | SG (signal ground) |
| DCD (data carrier detect) | CTS (clear to send) |
| DTR (data terminal ready) | RD (received data) |

End 1 of the cable would be connected to a device such as the data terminal. The TD pin is then connected, by wire #1, to the TD pin at end 2. This type of connection is used in a data terminal to modem type connection. The modem would then perform the function of inverting the wires to a corresponding wire on a data set. When a data terminal is connected to a data set, a null modem cable is utilized in place of a modem as previously described.

If the prior art was to be used as a null modem cable the configuration is created by connecting:

| End 1 | | End 2 |
|---|---|---|
| Transmit Data | connects to | Receive Data |
| Request to Send | connects to | Clear to Send |
| Data Set Ready | connects to | Data Terminal Ready |
| Data Carrier Detect | should not connect to | Signal Ground |
| Signal Ground | should not connect to | Data Carrier Detect |
| Data Terminal Ready | connects to | Data Set Ready |
| Clear to Send | connects to | Request to Send |
| Receive Data | connects to | Transmit Data |

The Data Carrier Detect pin on end 1 would be connected to the SG (Signal Ground) pin on end 2 by wire 4. In addition, the SG pin on End 1 would be connected to the DCD pin on End 2 by wire 5. This mirror image of the two ends results in the Signal Ground and Carrier Detect pins rendered useless and the null modem ineffective. The simple null modem demonstrated by the use of the DCD and SG leads to the situation that occurs when a conventional cable is attempted to be used as a null modem.

Figure 2:
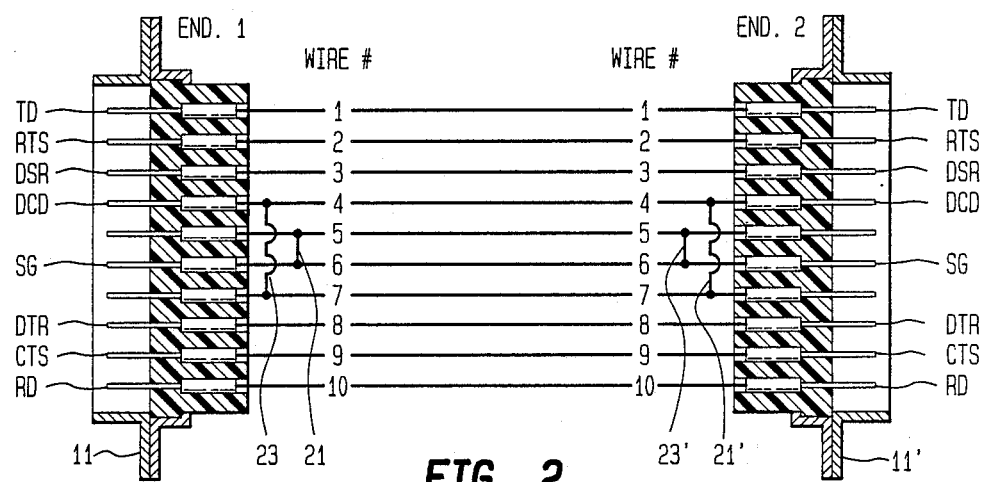
FIG. 2 is an electrical schematic depicting a conventional cable and connector assembly with the present invention installed.

The present invention creates a straight cable that in its primary form duplicates the function performed by the cable demonstrated in FIG. 2. The DCD pin on end 1 is connected to the DCD pin on end 2 by wire 4. In addition, a jumper wire 21 is placed between pin 4 and pin 7 on both ends although in this mode pin 7 is not connected at end 1 to a device and pin 7 at end 2 is not connected to a device.

Further, the SG pin on end 1 is connected to the SG pin on end 2 by wire 6. A jumper wire 23 is placed between pin 6 and 5 on both ends although in this mode pin 5 is not connected at end 1 to a device and pin 5 at end 2 is also not connected to a device. Both jumper wires 21 and 23 are made within the connector 11 as are jumper wires 21' and 23' made within connector 11'. The extra wire assigned to the DCD pin and SG pin do not affect the operation of the straight cable.

Figure 3:
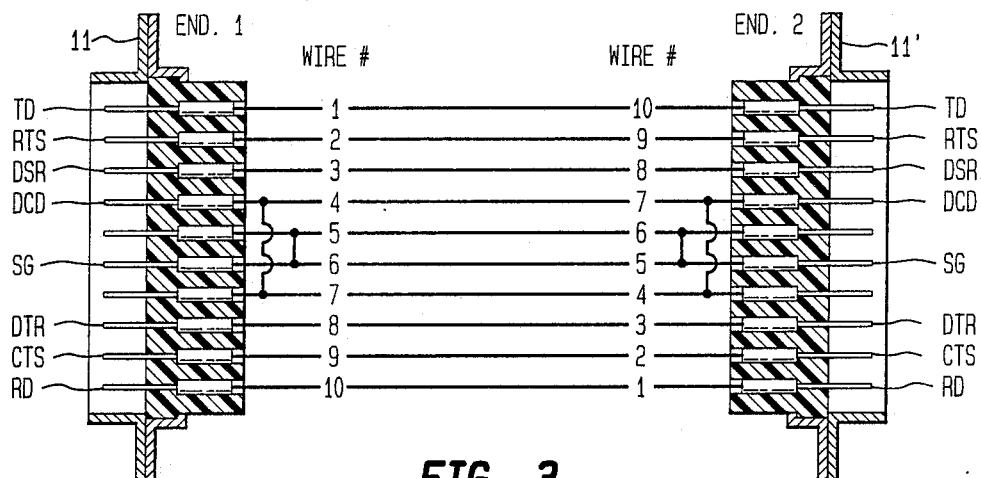
FIG. 3 is an electrical schematic depicting a conventional null modem cable and connector assembly with the present invention installed.

FIG. 3 depicts a proper null modem connection of the eight pin cable of the invention In the present invention the proper null modem is created by reversing either the D-25 connector within its slot thus forming:

| End 1 | Pin | End 2 | Pin |
|---|---|---|---|
| Transmit Data | 1 | Receive Data | 10 |
| Request to Send | 2 | Clear to Send | 9 |
| Data Set Ready | 3 | Data Terminal Ready | 8 |
| Data Carrier Detect | 4 | Data Carrier Detect | 7 |
| (Signal Ground) | 5 | (Signal Ground) | 6 |
| Signal Ground | 6 | Signal Ground | 5 |
| (Data Carrier Detect) | 7 | (Data Carrier Detect) | 4 |
| Data Terminal Ready | 8 | Data Set Ready | 3 |
| Clear to Send | 9 | Request to Send | 2 |
| Receive Data | 10 | Transmit Data | 1 |

Figure 4:
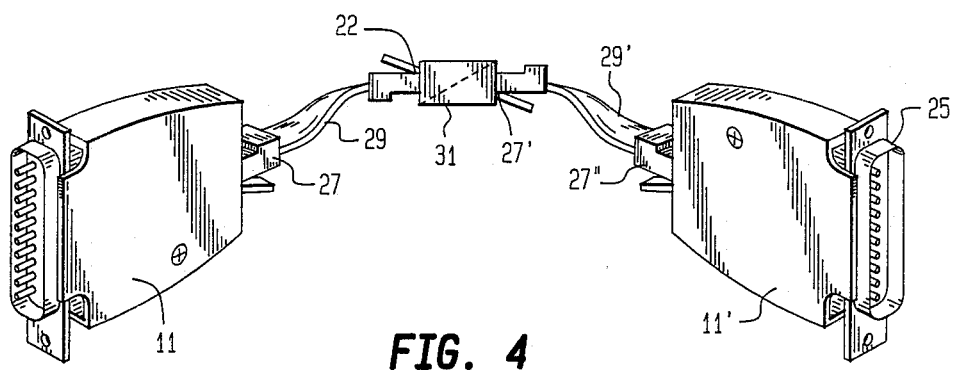
FIG. 4 is a pictorial view of a conventional cable coupled together by a null modem stub.

If a manufacturer uses only eight pins in a connector, it is also common to expect only eight wires within the cable. In effect one wire for each pin. For utilization of the present invention for all practical null modem combinations and to achieve the mirror image changeover, reference is made to FIGS. 4 and 5. The quick connects 27 and 27' will allow the cable to be inverted one hundred eighty degrees without removal of the D-25 connector. This device is necessary where conventional D-25 connectors use bidirectional shields to prevent incorrect connection before the plate 19 is physically attached to the terminal slot by mechanical means. Due to the manufacturer's extensive use of bidirectional shields 25 on the connector 11, the present invention is also achieved by utilizing a null stub 31 as depicted in FIG. 4. The D-25 connectors 11, 11' remain stationary and one of the quick connects 27, 27' is plugged into connector 11 to match the appropriate pins. The present invention allows the use such standard stub 31 whereby one quick connect is set in the upright position 22 and the second end 27 is in a inverted position forming a null modem type connection. It should be noted that cable 29, 29' may use quick connectors positioned in the same direction and a conventional stub connector 31 utilized whereby the stub inverts the wires within the device creating the null modem connection. The depiction of snap on connectors is for example only, the present invention will work with any type of cable or quick connect plug.

Figure 5:
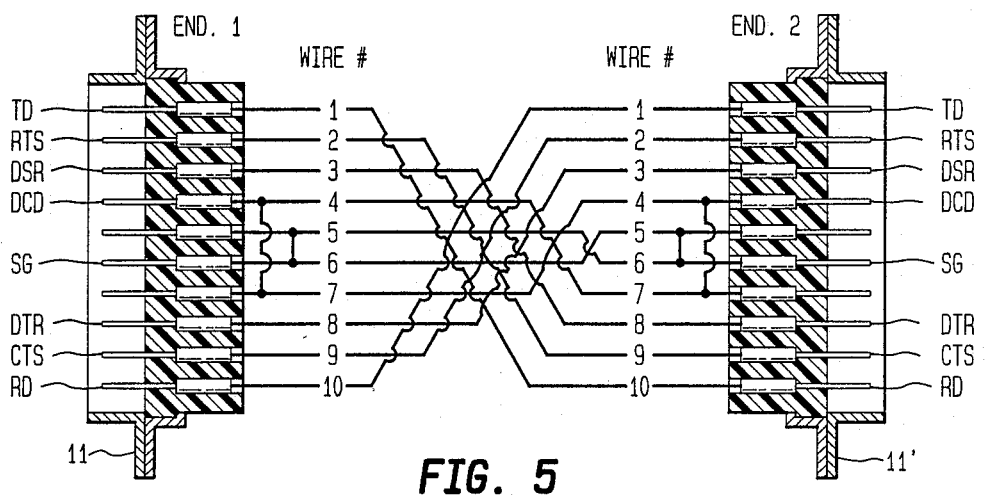
FIG. 5 is an electrical schematic depicting the resulting effect of a conventional null modem cable and connector assembly with the present invention installed.

FIG. 5 depicts the use of the null modem stub creating the same proper null modem cable assembly as depicted in FIG. 4 whereby the D-25 connectors have remained stationary and the null modem connection perform by means of the cabling between the connectors. The DCD pin on End 1 is coupled to end 2 a wire that is connected to pin 7 of End 2. As noted earlier, the DCD pin is used as only an example of a pin without a corresponding mate. In this figure, pin 7 on end 2 is the now corresponding mate which is jumpered to the mating DCD pin on end 2. It is feasible and with the scope of this invention to compliment each communications wire with a second wire or limit the wires to those without corresponding pins.

It is to be understood that the form of the invention described is to be taken as the preferred example of the same and various modifications of the assignment of wires may be resorted to without departing from the spirit of the invention of scope of the subjoined claims.

What is claimed is:

1. A data communications device for the transfer of data between data terminals and a data sets comprising:
   at least one of a first data terminal and a first data set;
   at least one of a second terminal and a second data set;
   a first connector comprising a plurality of individual electrical leads operatively coupled to said at least one of a said first data terminal and a first data set;
   a second connector comprising a plurality of individual electrical leads operatively coupled to said at least one of said second data terminal and second data set;
   a cable means comprising a plurality of electrical wires for electrically connecting said first and second connectors;
   the total number of said plurality of electrical wires of said cable means being an even number; a first one of said wires of said cable means being permanently, physically and electrically coupled to a second one of said wires of said cable means; first bridge-connector means for electrically connecting said first and second ones of said wires; said second one of said wires of said cable means being an asymmetric one not having a paired wire associated therewith, whereby said cable means is made symmetric so that it may be used to connect at least one of a first data terminal and data set to said at least one of a second data terminal and a second data set.

2. The apparatus according to claim 1, wherein said plurality of wires comprises a third wire thereof permanently, physically and electrically coupled to a fourth one of said wires of said cable means, a second bridge-connector means for electrically connecting said third and fourth wires together, said fourth one of said wires of said cable means also being an asymmetric one not having a paired wire associated therewith.

3. The apparatus according to claim 1, wherein said at least one of a first data terminal and a first data set is a data terminal, and said at least one of a second terminal and a second data set is also a data terminal.

4. The apparatus according to claim 1, wherein said at least one of a first data terminal and a first data set is a data terminal, and said at least one of a second terminal and a second data set is a data set.

5. The apparatus according to claim 1, wherein said at least one of a first data terminal and a first data set is a data set and said at least one of a second terminal and a second data set.

6. The apparatus according to claim 2, wherein said at least one of a first data terminal and a first data set is a data terminal, and said at least one of a second terminal and a second data set is also a data terminal.

7. The apparatus according to claim 2, wherein said at least one of a first data terminal and a first data set is a data terminal, and said at least one of a second terminal and a second data set is a data set.

8. The apparatus according to claim 2, wherein said at least one of a first data terminal and a first data set is a data set and said at least one of a second terminal and a second data set.

9. The apparatus according to claim 1, wherein said first bridge means comprises a pair of spaced apart connecting wires, each said connecting wire having a first end connected to said first wire and a second end connected to said second 10. A method of coupling between two data terminals or two data sets, and between a data terminal and a data set, in which there is provided a cable means comprising a plurality of electrical wires for electrically connecting said first and second connectors, where the total number of said plurality of electrical wires of said cable means being an even number; a first one of said wires of said cable means being electrically coupled to a second one of said wires of said cable means, said second one of said wires of said cable means being an asymmetric one not having a paired wire associated therewith, said cable having a first end coupler and a second end connectors, said method comprising:
(a) coupling a first data terminal and a first data set together by said cable means by the first and second end connectors thereof;
(b) uncoupling the first data set from its connection with the first end connector of said cable means;
(c) effectively inverting the uncoupled end portion of said cable means so that is 180 degrees out of phase with its original position assumed during said step (a); and
(d) coupling the thus-inverted end of said cable means to a second data terminal.

11. The method according to claim 10, further comprising:
(e) uncoupling the second end connector of said cable means from the first data terminal;
(f) effectively inverting the second end connector of said cable means so that is 180 degrees out of phase with its original position assumed during said step (a); and
(g) coupling the thus-inverted second end of said cable means to a second data set.

12. In a computer cable for use in coupling a data terminal to a data set, for connecting a data set to another data set, and for connecting a data terminal to another data terminal, the improvement comprising:
a plurality of electrical wires, the total number of said plurality of electrical wires of said cable means being an even number; a first one of said wires of said cable means being permanently, physically and electrically coupled to a second one of said wires of said cable; a first bridge-connector means for electrically connecting said first and second ones of said wires; said second one of said wires of said cable being an asymmetric one not having a paired wire associated therewith, whereby said cable is made symmetric so that it may be used to connect one of a first data terminal and data set to one of a second data terminal and a second data set.

13. The apparatus according to claim 12, wherein said first bridge means comprises a pair of spaced apart connecting wires, each said connecting wire having a first end connected to said first wire and a second end connected to said second wire.

14. The apparatus according to claim 13, wherein said plurality of wires comprises a third wire thereof permanently, physically and electrically coupled to a fourth one of said wires of said cable, and a second bridge-connector means for electrically connecting said third and fourth wires together, said fourth one of said wires of said cable means also being an asymmetric one not having a paired wire associated therewith.

* * * * *